United States Patent [19]

Larson

[11] 4,046,213
[45] Sept. 6, 1977

[54] CONTROL SYSTEM AND METHOD FOR CONTROLLING VEHICLE SPEED

[75] Inventor: Gerald L. Larson, Battle Creek, Mich.

[73] Assignee: Eaton Corporation, Cleveland, Ohio

[21] Appl. No.: 660,290

[22] Filed: Feb. 23, 1976

[51] Int. Cl.² .............................................. B60K 31/00
[52] U.S. Cl. .............................. 180/105 E; 235/150.2; 361/236
[58] Field of Search ............... 180/105 R, 105 E, 108, 180/109; 317/5; 318/571; 235/150.2; 123/102

[56] References Cited

U.S. PATENT DOCUMENTS

| | | | |
|---|---|---|---|
| 3,455,411 | 7/1969 | Carp et al. | 235/150.2 |
| 3,869,019 | 3/1975 | Cardani | 180/105 E |
| 3,885,137 | 5/1975 | Ooya et al. | 317/5 |
| 3,891,046 | 6/1975 | Oicles | 180/105 E |

Primary Examiner—Philip Goodman
Assistant Examiner—Terrance L. Siemens
Attorney, Agent, or Firm—Teagno & Toddy

[57] ABSTRACT

An electronic digital control system for vehicle speed control of the type using a throttle servoactuator responsive to an electrical control signal. The control system includes a function switch which, when selectively actuated by the vehicle operator, causes the controller to index the sensed vehicle speed by a predetermined increment and accelerates the vehicle to said indexed speed. The controller regulates vehicle speed by repetitively calculating the parameters of a governing equation and providing a control signal in the form of a series of width modulated electrical pulses having the width thereof proportional to the sum of the parameters of the governing equation. The control system utilizes only a single counting means for registering vehicle speed and the desired set, or reference, speed.

16 Claims, 12 Drawing Figures

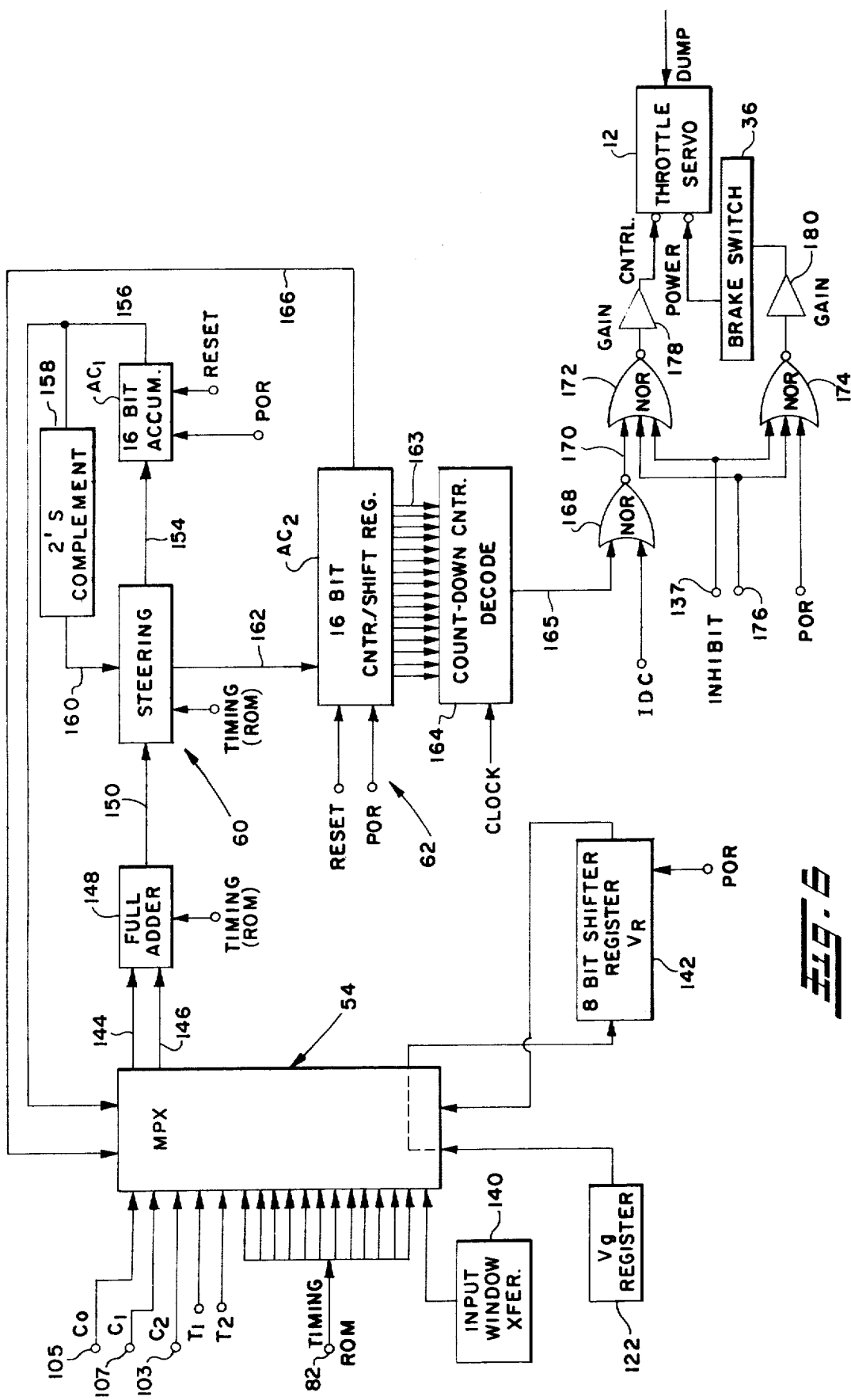

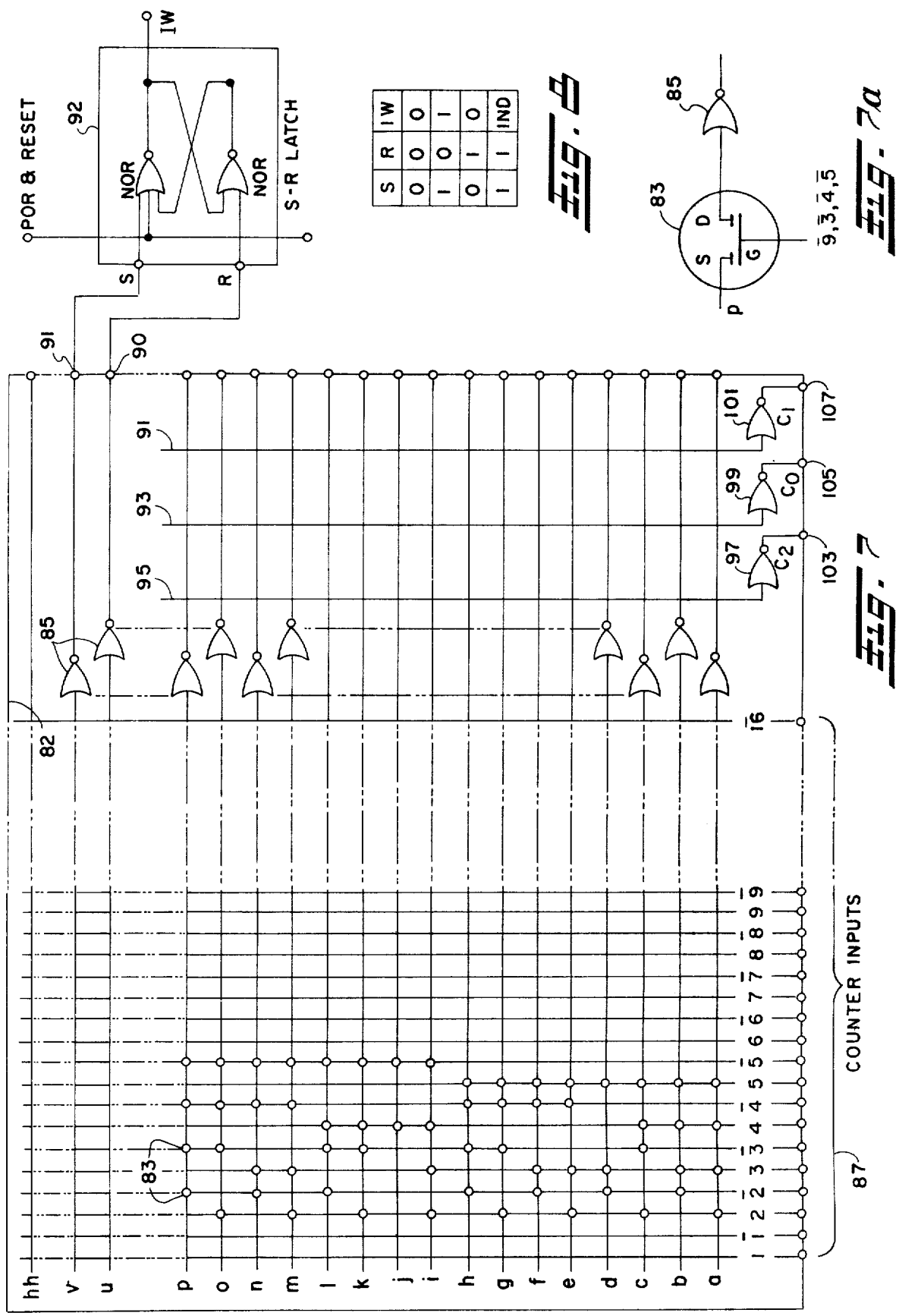

CONTROL SYSTEM AND METHOD FOR CONTROLLING VEHICLE SPEED

BACKGROUND OF THE INVENTION

Vehicle speed regulators or cruise controls, as they are commonly known, are generally separated into two types, the electromechanical type utilizing a speedometer-cable driven flyweight governor as a speed sensor and the electronic type which do not require a flyweight speed sensing means. Typically an electronic cruise control senses vehicle speed by measuring the output of a tachometer generator connected to the transmission output shaft or detecting the firing pulses from the engine ignition system. The electrically sensed vehicle speed is then electronically compared with the speed selected by the vehicle operator, and a control signal is generated having the characteristics thereof varied in accordance with such speed comparison. The control signal is applied to a servoactuator, usually of the pneumatically operated type, which servoactuator is connected to the vehicle throttle for moving same in response to the control signal. Several techniques for providing a control signal are known in the art and include a simple open loop comparison of the selected speed and vehicle speed by dividing speed error into incremental zones and providing predetermined control signal outputs as the speed error passes from one zone to another, an example of which technique is described in U.S. Pat. No. 3,869,019. A second type of electronic control is that using a governing equation in which the control signal characteristics are varied in accordance with successive computations of the values of the equation parameters using instantaneous values of vehicle speed, an example of which technique is described in the copending patent application, Ser. No. 469,568 filed May 13, 1974, now abandoned, in the name of G. L. Larson, Alberto Pi and M. W. Uitvlugt and assigned to the assignee of the present invention. Both of these aforementioned systems for providing a control signal by electronic techniques employ a control signal which comprises a series of pulses of substantially constant frequency whose width is modulated to indicate the signal intelligence.

The typical servoactuator employs a fluid chamber, the pressure of which is applied to an actuator, such as a flexible diaphragm, which moves in response to changes of pressure in the fluid chamber, and the actuator is adapted for connection to the vehicle throttle. The pressure in the fluid chamber may be controlled by a valve which alternates between a fluid pressure inlet and an exhaust port and, more commonly, a vacuum orifice and a vent orifice. The valve is thus of duty-cycle type operation and requires driving means responsive to the control signal for moving the valve. Typical speed control systems are usually activated by a switch in the form of a button depressed by the vehicle operator when the vehicle is travelling at the desired speed. The activation of the switch causes the control system to register the vehicle speed, at that point in time, as the selected speed at which the operator wishes the vehicle to be regulated. The selected speed or "SET" speed is then stored in the electronic memory of the control system and serves as a reference for continual comparison of the vehicle speed therewith. Such an arrangement is illustrated and described in the aforementioned copending application, Ser. No. 469,568 filed May 13, 1974.

However, as often occurs, the vehicle operator may wish to increase or decrease vehicle speed only a slight amount to accommodate changes in traffic and road conditions. In order to change the selected or governed speed of the system, it has heretofore been necessary to disable the control system as, for example, by tapping the brake pedal to cut the power supply to the controller by opening a series switch contacting the brake pedal and then manually accelerate or decelerate the vehicle to the desired new speed and reset the control system at this new desired speed. Such operations require that the driver take his eyes off the road and watch the speedometer until the vehicle has been brought to the new desired speed and the controller can be reset. This has proved to be annoying and also involves an element of hazard in diverting the driver's attention from traffic to the speedometer. Thus, it has long been desirable to provide some means of indexing the "SET" or control speed of a vehicle to accommodate minor changes in driving conditions, without requiring the vehicle operator to remove eyes from the road and divert his attention to the speedometer.

SUMMARY OF THE INVENTION

The present invention enables a vehicle operator to initially engage a cruise control system at a desired speed and thereafter to modify the desired or control speed by small predetermined amounts without going through a cycle of operations requiring disengagement of the controller. The present invention further permits the driver to modify the vehicle control or set speed by desired small predetermined increments without taking his eyes off the road and diverting attention to the speedometer. In this manner, the present invention thus provides a solution to the above-described problem of providing a cruise control system which enables the driver to adjust the "SET" or regulated speed without distraction.

The present invention utilizes electronic digital techniques for indicating the electrically sensed vehicle speed and for storing the desired set speed in a register. A pneumatic servoactuator is employed for movement of the vehicle throttle for controlling the vehicle speed about the desired set speed. The servoactuator is of the type having a source of fluid pressure applied to a pressure chamber provided in the servoactuator. The servoactuator responds to electrical control signal which controls the duty cycle of a movable valve means for controlling fluid pressure in the chamber; and, typically, includes a movable actuator which responds to the pressure in the chamber for movement of the vehicle throttle.

The control signal is generated by digital electronic techniques in the form of a series of substantially constant frequency pulses whose width is modulated to indicate the intelligence of the control signal.

The control system of the present invention provides a pulse width modulated control signal having the width of the pulses varied in accordance with the value of the parameters of a governing equation computed for instantaneous values of vehicle speed. The vehicle speed is measured over a control sampling interval in the order of a fraction of a second. The value of the vehicle speed over the control interval is expressed electronically in digital form and the parameters of the governing equation computed for the particular value of vehicle speed. The present control system generates a control signal pulse having a width representative of the parameters of the governing equation for that particular vehicle speed and SET speed. The parameters of the governing equation include predetermined constants electronically programmed into the controller.

The control system of the present invention includes a feature known as TAP-UP which permits the vehicle operator to increase the vehicle speed slightly by a predetermined increment in response to momentary actuation of the vehicle operator's SET control button. The invention includes the further convenience function that the vehicle may be continuously accelerated at a moderate rate above the control SET speed by successive repetitive TAP-UPS of the vehicle operator's SET control. This continuous acceleration by successive TAP-UPS function is in addition to the heretofore known RESUME function described in the aforementioned U.S. patent application, Ser. No. 469,568. The present invention thus permits the vehicle operator to TAP-UP the vehicle cruising speed without having to shift eyes from the road or divert attention to the vehicle speedometer for resetting the selected speed.

The present invention accomplishes the above-described TAP-UP function by applying an initial duty cycle value to the control signal to the servoactuator upon each activation of the vehicle operator's SET button and concurrently altering the control signal thereafter at that particular vehicle speed and SET speed. The parameters of the governing equation include predetermined constants electronically programmed into the controller.

The control system of the present invention includes a feature known as TAP-UP which permits the vehicle operator to increase the vehicle speed slightly by a predetermined increment in response to momentary actuation of the vehicle operator's SET control button. The invention includes the further convenience function that the vehicle may be continuously accelerated at a moderate rate above the control SET speed by successive repetitive TAP-UPS of the vehicle operator's SET control. This continuous acceleration by successive TAP-UPS function is in addition to the heretofore known RESUME function described in the aforementioned U.S. patent application, Ser. No. 469,568. The present invention thus permits the vehicle operator to TAP-UP the vehicle cruising speed without having to shift eyes from the road or divert attention to the vehicle speedometer for resetting the selected speed.

The present invention accomplishes the above-described TAP-UP function by applying an initial duty cycle value to the control signal to the servoactuator upon each activation of the vehicle operator's SET button and concurrently altering the control signal thereafter in a predetermined manner. The initial duty cycle IDC pulse is of the order of magnitude of 500 milliseconds and permits the servoactuator to be energized for a sufficient length of time to overcome hysteresis due to friction and return spring preload in the throttle mechanism and servoactuator to cause a throttle opening of about 0.10 inch. cause the vehicle to accelerate a moderate amount to provide the impetus for the incremental increase in speed.

In the TAP-UP mode function, the next control signal pulse following the IDC pulse reflects an incrementally indexed value of sensed speed at the moment SET button is actuated for TAP UP; and, the incrementally indexed vehicle speed is stored as the new SET speed. Performing TAP-UP by incrementally indexing the actual vehicle speed rather than the stored SET speed provides a safety factor, in the event of a malfunction or rapid repetitive TAP-UP mode actuation of the SET button, by preventing successive rapid indexing of the SET speed and thus averts the hazard of a "runaway" control signal.

The present invention utilizes digital electronic counting means for sensing and registering the vehicle speed. The governing equation calculation for generating the control signal pulses are performed in serial format digital logic utilizing time sharing of two storage registers during calculation of the governing equation parameters. This utilization of serial logic permits the digital electronics of the controller to be fabricated to an integrated circuit "chip" and miniaturized to a medium of "chip" area.

BRIEF DESCRIPTION OF THE DRAWINGS

FIG. 6 is a logic block diagram of the function of the multiplex, arithmetic processing and pulse width modulation portions of the system of FIG. 2;

FIG. 7 is an abbreviated logic block diagram of the ROM and decode portions of the system of FIG. 2 and FIG. 3;

FIG. 7a is an enlarged detail of a typical solid state device employed in the matrix of FIG. 7;

FIG. 8 is a truth table for the typical reset latch illustrated in FIG. 7;

DETAILED DESCRIPTION

Figure 1:
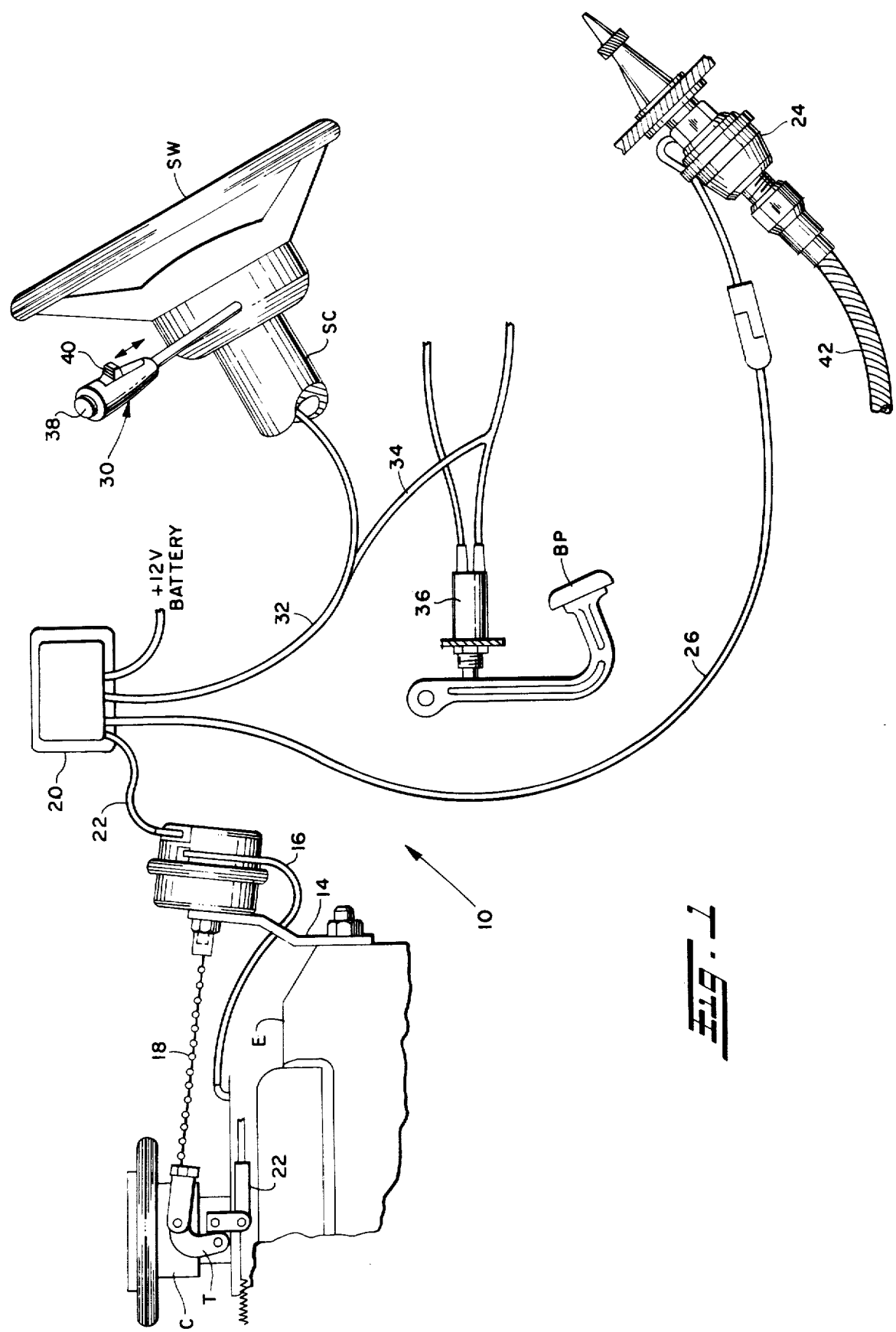
FIG. 1 is a pictorial illustration of the arrangement of the components of the cruise control system on the vehicle.

Referring now to FIG. 1, the present invention is embodied in a cruise control system 10 employing a throttle servoactuator 12 attached to the vehicle engine E on bracket 14. The vacuum supply hose 16 connects the servoactuator to a source of vacuum such as the intake manifold of the engine. A flexible cable 18 connects the servoactuator 12 to the vehicle throttle T provided in the carburetor C mounted on the engine. The housing 20 encloses the electronic control circuitry for generating the control signal supplied to the servoactuator 12 through leads 22. The controller 20 receives the speed signal input from a source 24 as, for example, speedometer cable driven tachometer generator through lead 26 to the controller 20. The controller 20 also receives inputs from a source of electrical power as, for example, a twelve volt ignition source on the vehicle through lead 28 and also receives an input from the driver actuated control 30 mounted on the steering column SC below the steering wheel SW, which input is through the lead 32 disposed along the steering column from the driver's controls 30. The controller 20 also receives a brake-Disable/Enable signal through lead 34 from the brake switch 36 actuated by movement of the vehicle service brake pedal BP.

The vehicle driver's controls 30 are preferably disposed on the turnsignal lever and include a depressible button-type switch 38 mounted in the end of the turn signal lever handle. The button 38 is operable to activate the system in the SET mode and the TAP-UP mode by depressing and then releasing the button 38. The COAST mode is obtained by holding the button 38 depressed. A slide-switch 40 is provided on the driver's side of the turn signal lever handle and is disposed to slide longitudinally in opposite directions along the turn signal lever in response to manual activation by the driver. The slide switch 40 is of the left-center-right type biased from right to center and detent latched to left and provides the controls for the power supply OFF and ON functions, with the center position of the slide switch being the ON position and the leftmost position of the switch being the power OFF position. The slide switch 40 is also movable to the rightmost position which actuates the system in the RESUME mode for resuming vehicle speed after disengagement of the system by actuation of the brake pedal.

The system of the present invention utilizes a similar servoactuator, brake switch, signal source, and arrangement of driver actuating controls as that described in the aforementioned copending U.S. patent application, Ser. No. 469,568.

The improvement comprising the present invention is disposed within the controller housing 20 and in the addition of the TAP-UP function to the speed set button 38. It will be understood, however, that any of the types of servoactuators of the duty cycle type capable of operating on a width modulated pulse control signal may be employed, and the choice of servoactuator otherwise forms no part of the present invention. The preferred arrangement of the driver actuated control 30 is illustrated in FIG. 1, wherein the controls are mounted on the handle of the turn signal lever extending from the steering column behind the steering wheel. However, it will be understood that other arrangements of the driver actuated controls for the cruise control may be utilized and it is not a requirement that the controls be mounted on the turn signal lever handle. The present invention thus uniquely combines the control for the SET and TAP-UP and COAST functions in one actuator in the form of the depressible-releasable button 38; and, it will be understood that irrespective of the arrangement of the driver controls 30 that the TAP-UP and SET functions are preferably to be provided by a common actuator device such as the button 38.

It will also be understood to those having skill in the art that, in vehicle applications having automatic transmissions, the tachometer generator 24 illustrated in FIG. 1 is the preferred manner of providing the speed signal indicative of the rate of rotation of the vehicle drive wheels. Such a tachometer generator is conveniently mounted in the transmission tail stock and is gear driven from the transmission output shaft. This arrangement permits the speedometer drive cable 42 to be conveniently attached to the tachometer generator to sense the same rate of rotation. It will be understood, however, to those having ordinary skill in the art that, in applications on vehicles having direct drive trains as, for example, manual transmissions employing a manually actuated fully engaging clutch, it is not necessary to employ the tachometer generator 24, but, that a suitable speed signal may be obtained by sensing the ignition pulses of the engine. In such power trains, engine speed is directly proportional to the transmission output speed and is equal to propeller shaft speed in the direct drive gear and may thus be used as the source of vehicle speed signal.

Figure 2:
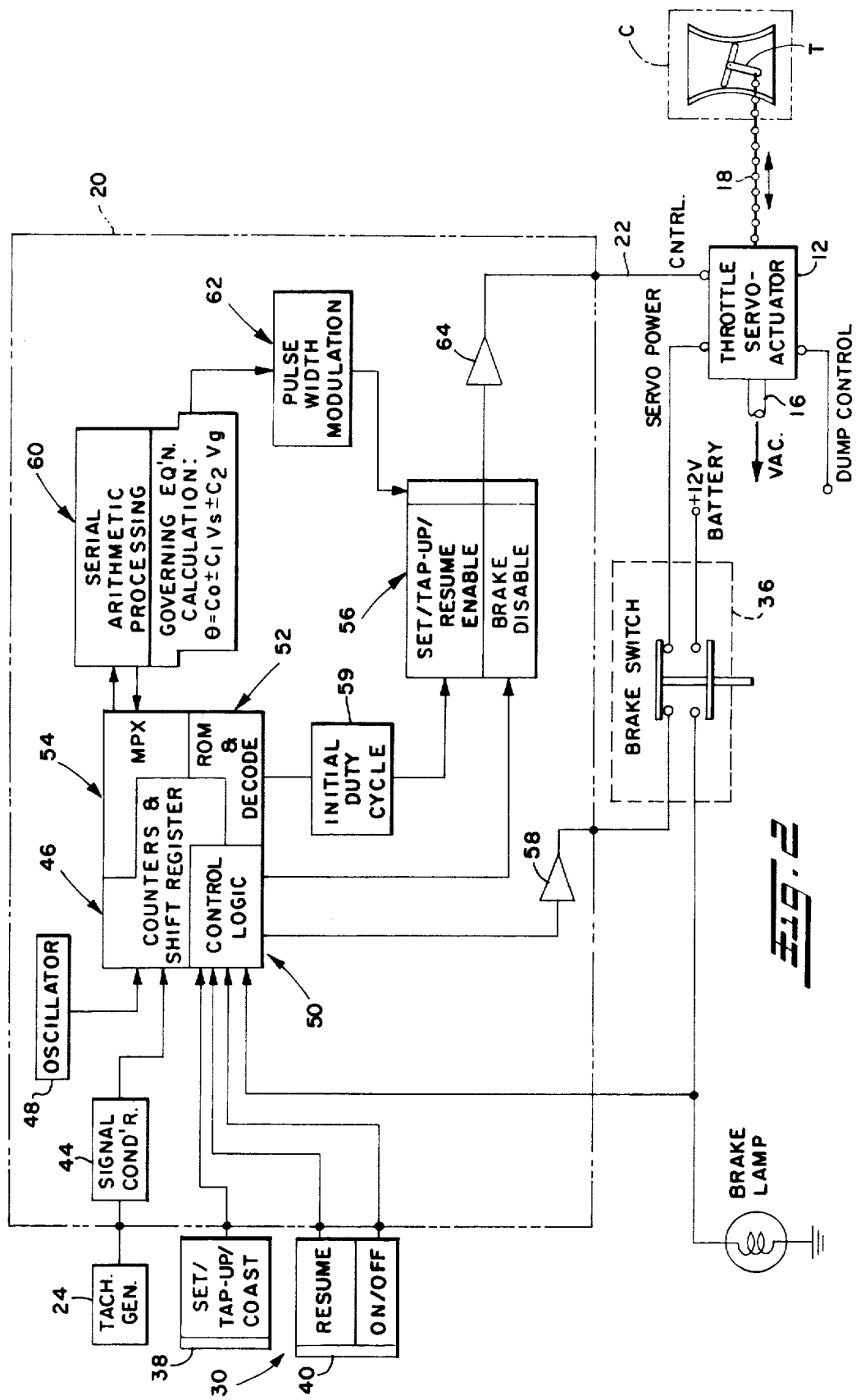
FIG. 2 is a functional block diagram of the logic of the cruise control system.

Referring now to FIG. 2, a simplified form of the logic of the electronic system controller is shown within the region bounded by the dashed line 20. The remaining functional portions of the cruise control system are shown in block diagram form and connected to the controller 20. The speed signal from the tachometer generator 24, or alternatively from the engine ignition pulses, is amplified and shaped in a signal conditioner 44 which may include conventional Schmitt-Trigger techniques, and the output thereof is applied to the digital counting logic 46. The digital counting logic also receives a clocking signal from a time source such as oscillator 48. The controller 20 also includes a control logic group 50 interconnected with the digital counting logic 46, which control logic 50 receives direct inputs from the driver actuated control button 38 for the SET/TAPUP and COAST functions and also from the slide switch 40 for the ON/OFF and RESUME functions. The control logic 50 is also interconnected with a Read Only Memory, ROM, and Decode logic group 52, which ROM is interconnected with the counting logic 46 and with a multiplexer logic group 54, which multiplexer is also interconnected with the counting logic 46. One output of the control logic group 50 controls a brake disable gate 56 and a second output of the control logic is applied through a transistor gain element 58 and subsequently through a normally closed set of contacts of the brake switch 36 for supplying power to and disabling the throttle servoactuator 12. A second, normally open set of contacts on brake switch 36 is connected to the vehicle brake lamp circuit and also the control logic group 50 for providing a brake signal thereto. An output from the ROM and Decode logic 52 provides a signal for the initial duty cycle 59, or predetermined value of the control signal, which is applied to an input of the Enable/Disable logic 56. The multiplex logic 54 has the output thereof applied to the input of the serial arithmetic processing unit logic 60 which has an output thereof feeding back to the multiplex logic 54.

The arithmetic processing unit performs the calculation for the governing equation for producing the intelligence for width modulating the output pulses forming the control signal applied to the servoactuator. The calculating function of the arithmetic processing logic 60 involves the transfer of bits of information cyclically to and from the multiplexing logic 54 during the process of calculation which is performed in serial format. The sum of the governing equation parameters comprises the output of the arithmetic processing logic 60 and is modulated as variation in width of a series of pulses from width-modulation logic group 62. The width-modulated pulses 62 are applied through the Enable/Disable gate logic 56 to a current gain element 64 which supplies the pulse width modulated control signal from the controller 20 through electrical leads 22 to the control input of servoactuator 12.

CONTROL LOGIC AND TIMING

Figure 3:
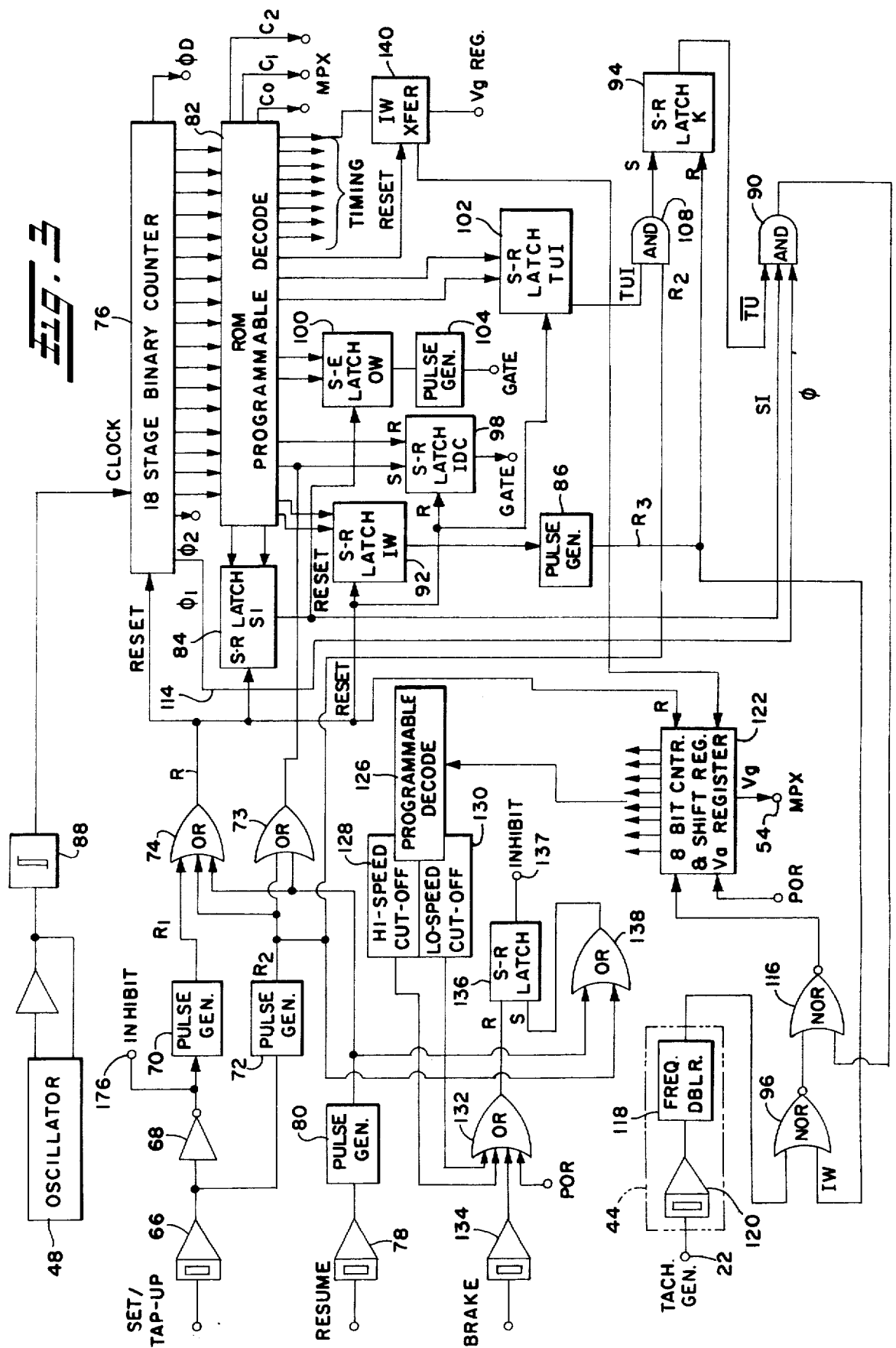
FIG. 3 is a somewhat detailed logic block diagram of the control section, counter/shift register, and ROM and decode portions of the system of FIG. 2.

Referring now to FIG. 3, the signal from the driver actuated SET/TAP-UP/COAST button 38 is shaped and amplified through a signal conditioning unit 66, and the output thereof is inverted through inverter 68 and applied to a first pulse generator 70 which produces a short duration output pulse $R_1$ on the order of 50 microseconds in width in response to the leading edge of the pulse from the inverter 68. The signal output of the conditioner 66 is also applied to the input of a second pulse generator 72 which also produces a short duration pulse on the order of 50 microseconds upon experiencing the trailing edge of the signal from the conditioner 66. The pulse signals $R_1$ and $R_2$ are each applied to the separate inputs of an OR device 74, the output of which is applied to the reset line which services counting means including shift registers and ROM memory latches.

The resume switch 40 of the driver actuated controls has the signal therefrom applied through a signal conditioner 78 to the input of a pulse generator 80 which provides an output pulse of short duration which is applied to a third input of OR 74.

The binary counter 76 has the outputs of its registers applied to inputs of a read-only memory (ROM) 82 which will be hereinafter described in further detail, which has outputs thereof connected to a series of set-reset latches and which also provides a plurality of timing signals and outputs for each of the individual reference constants $C_0$, $C_1$ and $C_2$ for the governing equation, which constants are applied to inputs of a multiplexer which will be hereinafter described in greater detail with respect to the governing equation calculation. A pair of outputs from the ROM 82 are applied to the set and reset inputs of a set-reset latch 84 whose output is the set increment SI in the form of a pulse having a width equal to four clock pulses from the counter 76. The counter 76 receives timed pulses from an oscillator 48, the output of which is inverted and applied to a wave shaping circuit device 88 which provides a series of pulses of constant frequency which serve as a clock or time base for the counter 76. The output of the SI latch 84 is applied to one input of a triple input AND device 90.

A second pair of outputs from the ROM 82 is applied to the set-reset inputs of a set-reset latch 92, the output of which gives the input window IW, which is applied to the input of a pulse generator 86 which produces a short pulse $R_3$ on the trailing edge of the IW signal. In the presently preferred practice the IW pulse has a width of approximately 130 milliseconds corresponding to 180 speed signal pulses at 90 m.p.h., as will hereinafter be described in further detail. The short pulse $R_3$ is applied to the reset input of a set-reset latch 94. The IW pulse is also applied to one input of a NOR logic device 96.

A third output from the ROM 82 is applied to the reset input of a latch 98, the output of which provides the initial duty cycle pulse IDC which is applied to a control input of gate 56 (see FIG. 2). In the preferred practice a pulse width of 500 milliseconds for the IDC pulse has been found quite satisfactory for initially energizing the servoactuator.

A fourth set of outputs from ROM 82 is applied to the set-reset inputs of a latch 100, the output of which comprises the output window signal OW which is applied to the input of a control gate, as will be hereinafter described. A fifth pair of outputs from ROM 82 is applied to the set-reset inputs of a latch 102, the output of which gives the tap up in terval TUI which is applied to one input of dual input AND 108. A pulse $R_2$ is provided from pulse generator 72, which detects the leading edge of the SET pulse, and $R_2$ is applied to the remaining input of AND 108, the output of which is applied to the set input of set-reset latch 94.

The output of latch 94, denoted TU, is applied along line 112 of FIG. 3 to one input of an AND logic device 90. The output of latch 94 comprises the TAP-UP signal $\overline{TU}$ which is applied to one input of AND device 90. The remaining input of AND 90 receives a timing signal 114 from the eighteen stage counter 76. The output of AND 90 is applied to the input of a NOR logic device 116 which has the remaining input thereof connected to the output of a NOR device 96. One input of NOR 96 receives a signal through a frequency doubler 118 which halves the period of the signal from the wave conditioner 120 which receives at its input the output of the vehicle speed sensing source 24, such as a tachometer generator. The remaining input of NOR 96 is connected to the output of IW latch 92 and receives the 130 milliseconds IW timing pulse for gating the output of frequency doubler 118.

The output R of OR device 74 is also connected to the reset inputs of an eight-bit counter and shift register 122 which receives at its data input the output of NOR device 116 and thus counts and registers vehicle speed. The vehicle speed $V_g$ is obtained from the register 122 and is applied through its output 124 in serial format to the multiplexer 54 which will be described hereinafter in greater detail. The output of the eight-bit counter 122 is applied to the input of a read only memory ROM 126, the outputs of which are applied to the set-reset inputs of a latch 128 which provides the high speed cut-off signal. A second pair of outputs of ROM 126 are applied to the set-reset inputs of a Low Speed Cut-Off latch 130, the outputs of which latches 128 and 130 are applied, respectively, to separate inputs of an OR logic device 132. OR 132 has the output of the brake switch 36 applied through a wave shaping device 134 to separate input thereof. The output of OR 132 is applied to the reset input of a set-rest latch 136. The set input of latch 136 receives the output of an OR logic device 138 which has one input thereof connected to the output of pulse generator 72 to receive the signal $R_2$ and the remaining input thereof connected to the output of the pulse generator 80 to receive the RESUME signal. The $V_g$ register 122 also receives, at the set input thereof, a timing signal from the input window transfer latch IW XFER 140 which receives timing signals from ROM 82. It will be understood to those skilled in the art that the set-reset latches and counters all are connected to a power-on reset, POR, which clears these logic devices upon actuation of the ON mode of the slide switch 40 on the driver's controls.

Figure 4:
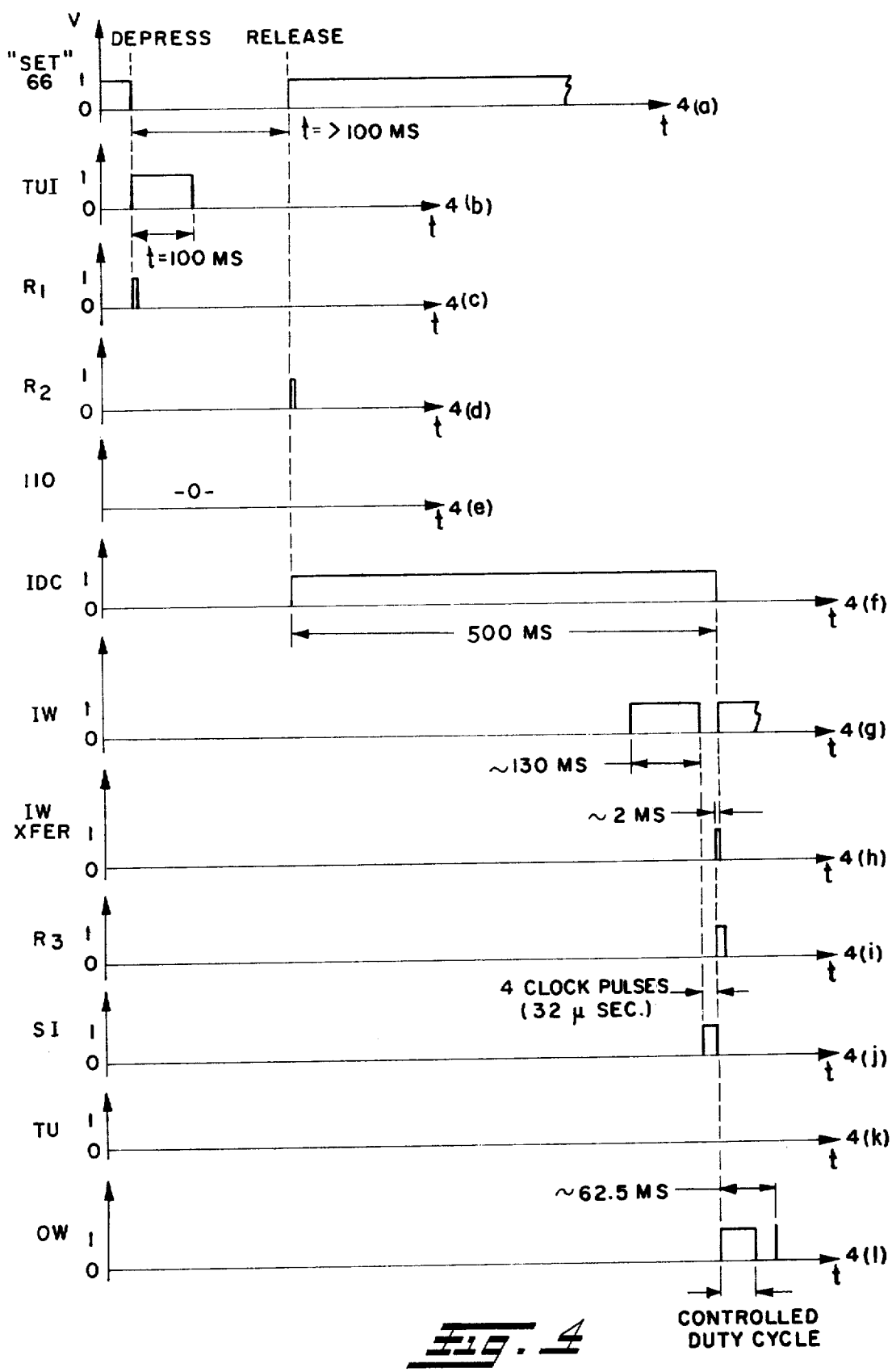
FIG. 4 is a timing diagram in the SET function mode, of various subsignals within the control signal generating circuit.

Referring now to FIG. 4, the timing and sequence of various subsignals in the logic of FIG. 3 are shown for the SET mode function of the driver control button 38. FIG. 4a shows the output signal from wave shaping device 66 where a time period greater than 100 milliseconds elapses between the depression and release of the button 38. FIG. 3b shows the output of TUI latch 102 beginning with the depression of SET button 38 wherein the latch 98 emits a signal of predetermined duration and preferably 100 milliseconds for providing a reference signal for determining whether the driver has intended to activate the SET or TAP-UP mode. The signal TUI from latch 102, thus preprogrammed by ROM 82, changes state after the elapse of 100 milliseconds from first depression of button 38. When button 38 is first depressed, pulse generator 70 emits a pulse $R_1$ as shown in FIG. 4c and the pulse generator 72 emits a pulse $R_2$ upon release of the set button 38, as shown in FIG. 4d. Either of these two pulses, $R_1$ or $R_2$, is passed through gate 74 to reset the counter 76, counter 122 and set or reset the various ROM timing latches.

The IDC latch 98 is set by receipt of pulse $R_2$ through OR 73. However, either pulse $R_2$ or the RESUME pulse from generator 80 are sent through an OR device 73 to the set input of IDC latch 98. Upon receipt of pulse $R_1$ the counter 76 and ROM 82 supply pulses to the TUI latch 102, which pulses have a duration of 100 milliseconds, as shown in FIG. 4b and, upon the decay thereof, set the TUI latch 102. It will be noted that, in the SET mode of operation, where the SET signal 66 exceeds 100 milliseconds as shown in FIG. 4a, the TUI latch 102 is set before the signal $R_2$ from generator 72 and is applied to reset the counter 76. The sequence of these signals is illustrated in FIGS. 4a through 4e.

When set with the signal of FIG. 4a, the TUI latch 102 returns to zero level before the pulse $R_2$ of FIG. 4d is applied to the counter 76 to reset the counter. With a zero output from the TUI latch 102 applied to one terminal of AND 108, latch 94 is not set and has no output as shown by the truth table in FIG. 10a. AND 108 cannot have an output until the SET signal from 66 is returned to zero by releasing the button 38 which causes AND 108 to apply a signal along line 110 to the set terminal of latch 94 which receives, at its reset terminal, the output of IW latch 92 and latch 94 yields, at its ouput, the tap up signal $\overline{TU}$ applied to AND gate 90. Thus it will be seen that, where the TUI signal from latch 102 goes to zero level before release of the set button 38, AND 108 is not enabled. Thus, there is no TAP-UP signal when the signal from latch 102 is permitted to go to zero before release of set button 38. This occurs when the SET button 38 is held depressed for more than the duration of the TUI signal which is preferably 100 milliseconds and in the range of 80–120 milliseconds.

Figure 5:
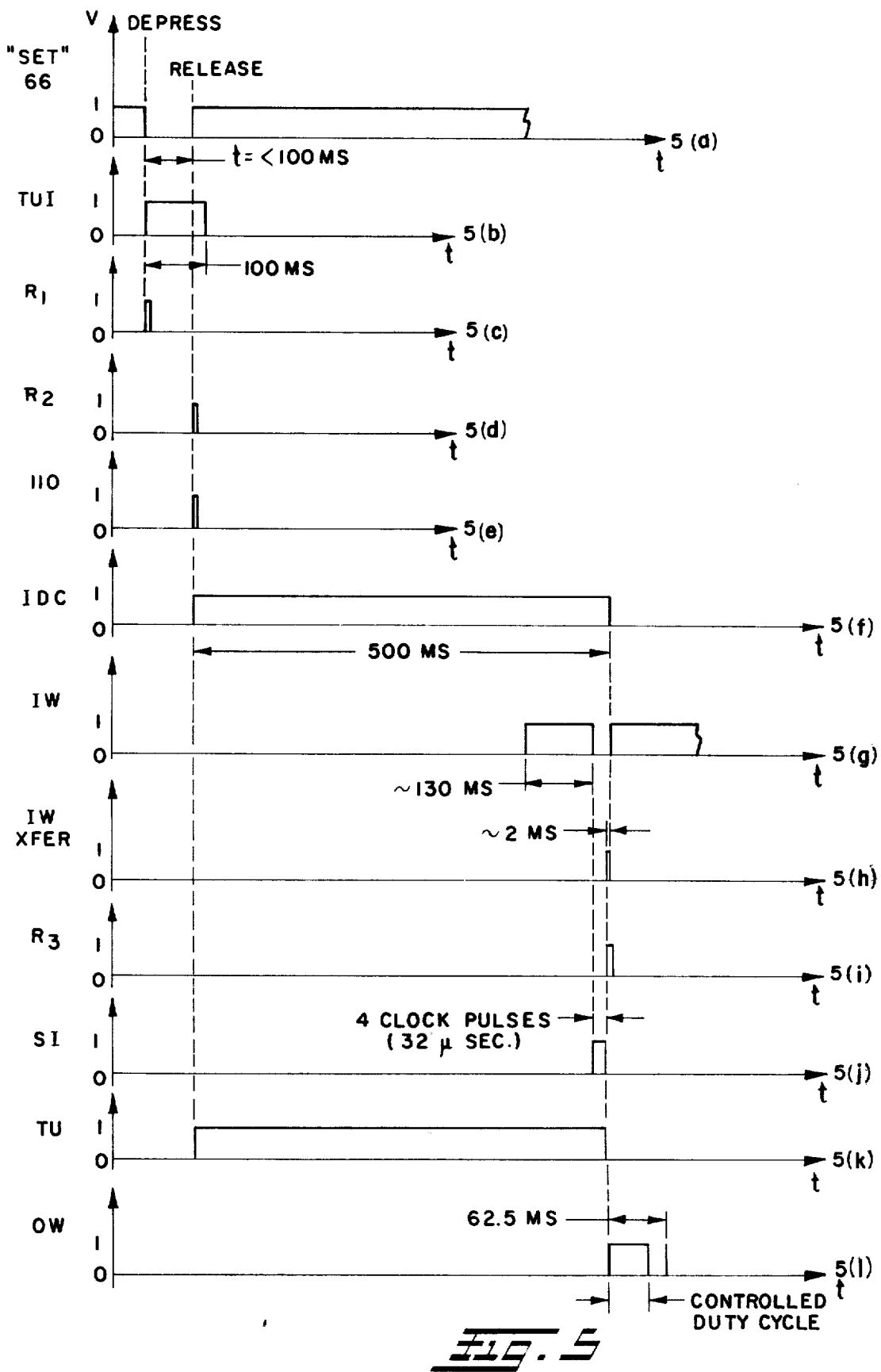
FIG. 5 is a view similar to FIG. 4 and shows the timing sequence, in the TAP UP function mode, of various subsignals within the control signal generating circuit.

Referring to FIG. 5, the sequence and timing of the logic signals is illustrated for the TAP-UP function in which the set button 38 is depressed and released in an elapsed time less than the 100 milliseconds duration of the TUI signal as illustrated in FIG. 5a. The release of the SET button 38 before the TUI signal goes to zero results in the signal from wave shaper 66 going to a logic zero before the TUI signal 102. A zero level signal from shaper 66 initiates the pulse $R_2$ from signal generator 72 as shown in FIG. 5d and pulse $R_2$ sets the IDC latch 98 and begins the output of the IDC signal which, in the preferred practice of the invention, has a duration of 500 milliseconds and is sequenced as shown in FIG. 5f. It will be noted that AND 108 receives at one input the TUI signal which causes the AND 108 to have an output along line 110. With reference to FIG. 10b, the latch 94 is set whenever the signal along line 110 is at a logic 1 and the signal at the reset terminal thereof from IW latch 92 is at a logic zero. The output of latch 94 is thus the TAP-UP signal TU which is applied to one input of triple-input AND 90. In order for the TAP-UP to occur, the set button 38 must be released before the TUI signal of FIG. 5b from latch 102 goes to zero in order for AND 108 to set the latch 94. The timing and sequence of the signals TUI 110 $R_3$ and TUI are shown respectively in FIGS. 5f, 5e, 5i and 5k.

Upon receipt of the reset pulse "R" of FIG. 5d, the counter 76 and ROM 82 are reset to zero and begin counting time. Upon receipt of either pulse $R_2$, from generator 72, or the pulse from RESUME pulse generator 80, the IDC latch 98 is set in the on condition. Counter 76 begins counting up and, upon elapse of a predetermined IDC time, — preferably 500 milliseconds —, IDC latch 98 is turned off. Thus, when either switch 40 is activated into the RESUME position or SET button 38 is released from the depressed condition, a 500 millisecond IDC pulse is generated. Just prior to termination of the IDC pulse from latch 98, the ROM is operative to set the input window latch 92, which produces a pulse of 130 milliseconds width which is applied to one input of NOR 116 for cycling the sensed speed from frequency doubler 118 into the $V_g$ counter and register 122. The Input Window Transfer latch IW XFER 140 transfers the sensed speed from the counter portion to the register portion of a counter-shift register 122 at the end of the input window signal. Prior to the termination of the input window the ROM 82 sets the latch 84 for the set increment SI which is applied to one terminal of AND 90. A synchronizing time signal line 114 from the counter 76 clocks the set increment SI through AND 90 to NOR 116 for adding the set increment to the count of the vehicle speed from NOR 96 as it passes into the counter shift register 122. In the preferred practice of the invention the SI pulse is four clock pulses, and preferably, these are equal to a total speed increment of two miles per hour.

In operation, when the set button 38 is depressed and normally released, the reset signal from OR gate 74 resets counter 122 and the IW signal from latch 92 applies the vehicle speed signal from frequency doubler 118 to the counter 122. At the expiration of the 500 millisecond IDC signal of FIG. 4b, the IW signal terminates the input from frequency doubler 118 to the counter 122.

In the event that the set button 38 is released in less than 100 milliseconds as shown in FIG. 5a, AND 108 sets latch 94 which permits AND 90 to add the Set Increment SI to the number of pulses counted by counter 122 at the end of the IW counting period and the IW XFER signal transfers the incrementally indexed count through the MPX to the $V_R$ SET speed register.

Referring now to FIG. 7, the logic of a portion of the ROM and programmable decode section 82 of FIG. 3 is shown schematically wherein a grid or matrix comprises ordinates 1, 1, 2, 2 - —16, $\overline{16}$ and abscissa a, b---y, z, aa, bb,---hh, selected ones of which are illustrated in FIG. 7. The ROM is preprogrammed by the incorporation of solid state switching devices, for example, transistors are preselected individual coordinate intersections of the matrix as denoted by the circles 83 in FIG. 7. The ordinate lines 1, 1---16, $\overline{16}$ are connected in pairs to the outputs respectively of the individual stages of the counter 76 for receiving an output signal therefrom upon activation of the register to a logic one condition. The abscissa lines a, b---hh are each connected individually to one of NOR logic devices 85 the outputs of which are connected in pairs to a series of set-reset latches. For example, the output of the NOR device from matrix abscissa line u is connected along the line 89 to the reset input of IW latch 92 and the output of one of the NOR devices 85 along matrix abscissa line v is connected along line 91 to the set input of latch 92. The latch 92 produces at its output the input window IW signal and has a Power-On-Reset and Reset line for connection to the output of OR 74 of FIG. 3. The IW latch 92 is typically arranged by cross-coupling a pair of NOR logic devices as illustrated in FIG. 7, and operates to latch upon receipt of a signal at the set input thereof in accordance with the truth table illustrated in FIG. 8 wherein it is shown that the latch yields no output when logic one signal is received at the reset input. The illustrated connections from the ROM 82 to IW latch 92 are typical of mating abscissa lines $p$ –$hh$ and are representative of the logic employed for providing the various time signal outputs required for providing the vehicle speed signal, the set speed signal and for performing the calculations of the governing equation and providing the appropriate synchronization of the output signal. The matrix abscissa lines $a$ through $o$ of ROM 82 provide the signals for timing of the calculations performed by the multiplexer and arithmetic processor and are labelled in FIG. 3 as the series of eight timing leads from the right-hand portion of ROM 82. Referring to FIG. 7a, the details of a typical solid state device employed at one of the active junctions 83 of the ROM matrix network 82 is shown in an enlarged view. Preferably, MOS type transistor devices are used, with the source connected to the abscissa lines shown typically for line p of the network 82 with the gate line of the MOS device connected to one of the ordinate lines, typically lines $\bar{2}$, $\bar{3}$, $\bar{4}$ or $\bar{5}$ and the drain or outputs of the devices connected along the abscissa line to one of the NOR devices 85. It will be understood, however, by those skilled in the art, that other solid state devices may be used for the junctions 83, as, for example, rectifier devices may be employed in place of MOS transistor devices.

The ROM device 82 also includes three separate ordinate lines 91, 93, 95 each connected through an individual NOR logic device 97, the output of which provides one of the predetermined constants $C_1$, $C_0$, $C_2$, respectively. It will be appreciated by those skilled in the art that the essential logic scheme of the ROM 82 has been presented with portions thereof deleted for clarity of illustration.

With reference to FIG. 6, the basic logic of the multiplex section 54 and serial arithmetic processing section 60 of the controller of FIG. 2 are illustrated, with the multiplex section receiving, at separate inputs thereof, the values of the constants $C_0$, $C_1$, and $C_2$ from the separate output lines of the ROM 82. The mulitplex section also receives clock signals $T_1$ and $T_2$ along separate line outputs of the eighteen stage binary counter 76. A group of timing signals are also supplied to the multiplex section directly in parallel format from the ROM 82 and include a separate signal from the input window transfer IW XFER 140 and a signal from the $V_g$ register 122. The IW XFER signal is operative to transfer the count stored in register 122 to an eight bit shift register 142, which is the SET speed or $V_r$ register.

The multiplex section 54 has separate outputs along lines 144 and 146 to inputs respectively of a full adder 148, the output of which is applied along line 150 to the input of a steering logic section 152. The steering section 152 has an output along line 154 to the input of a 16 bit accumulator $AC_1$, the output of which is fed back along line 156 directly to the multiplex section and also fed back to a two's complement section 158, the output of which is applied along line 160 to a separate input of the steering section 152. The steering section 152 has a separate output along line 160 which is applied to the input of a 16 bit counter shift register $AC_2$. The output of the register $AC_2$ is applied in parallel format to a count down counter and decode section 164. The output of the counter shift register $AC_2$ is also applied in serial format along the line 166 which is fed back to the multiplex section 54. The adder 148 and steering section 152 both include clock inputs for appropriate timing signals. The counter-shift register $AC_2$ and accumulator $AC_1$ both include inputs for reset and power-on-reset. A NOR logic device receives at one input thereof the output of the counter 164 and the remaining input thereof connected respectively to the IDC latch 98. NOR 168 has the output thereof applied along line 170 to one input of a dual input NOR logic device 172. NOR 168 and NOR 172 form a part of the enable/disable gate logic 56 of FIG. 2. A second NOR logic device 174 is provided with one input thereof in common with the remaining input of NOR 172, the common inputs receiving a signal from the brake inhibit line 137 of FIG. 3. The remaining input of OR 174 is connected to the power-on-reset. The outputs of NOR device 174 is applied to the input of amplifier 180, and the output of amplifier 180 is applied through brake switch 24 to the dump signal terminal of the throttle servo 12. The output of amplifier 178 transmits the signal from the ouput of NOR 172 to the Control terminal of the throttle servo 12.

GOVERNING EQUATION COMPUTATIONAL LOGIC

Referring now to FIGS, 6, 9 and 11, the sequence of operation for the digital calculation of the governing equation parameters is accomplished by serial format addition to provide the product terms of the governing equation, namely $C_1 \times V_r$ and $C_2 \times V_g$. The multiplication of the products $C_1 \times V_r$ and $C_2 \times V_g$ is performed by bit-by-bit addition using NOR logic and employing the theorem $\overline{A + B}$ equals $\overline{A}.\overline{B}$. The operational logic for performing the serial multiplication embodies a conventional adder 148, the output of which is a partial product which is stored in either of the accumulative registers $AC_1$ or $AC_2$. The partial products in registers $AC_1$ and $AC_2$ are then recirculated through the multiplexer 54 and added to the next partial product from the adder 148 until all of the significant bits of the values of the constants $C_1$ and $C_2$ have been multiplied by the values of the set speed $V_r$ and vehicle speed $V_g$.

Figure 9:
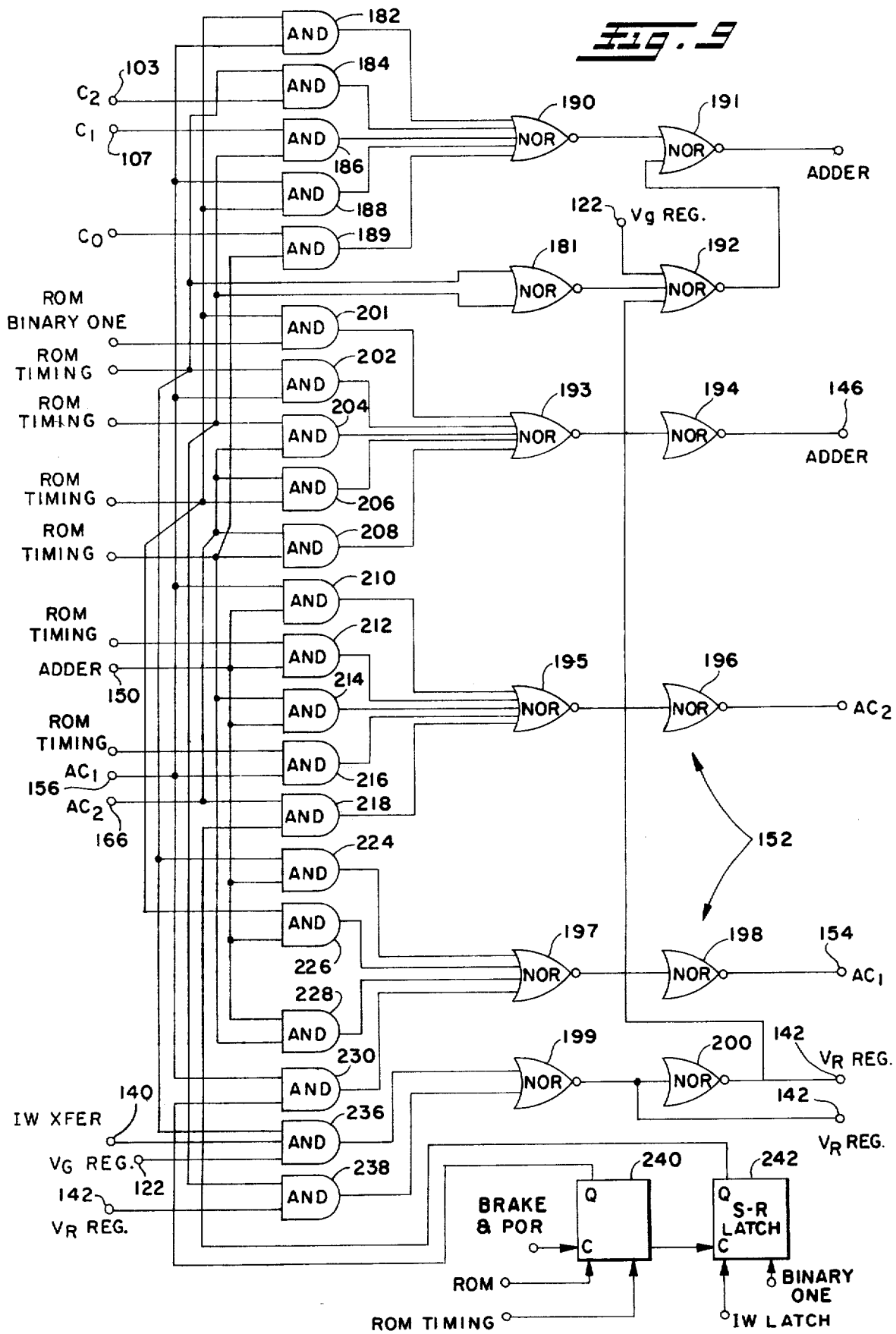
FIG. 9 is a somewhat detailed logic block diagram of the multiplex portion of the system of FIG. 2 and steering portion of FIG. 6.

The details of the computational logic and the implementation thereof will be understood by reference to FIG. 9 wherein the logic of the multiplexer 54 and the steering section 60 are shown. Multiplexer 54 comprises a dual input NOR logic device 191, the output of which is applied along line 144 to the full adder, a NOR logic device 192, the output of which is applied to one input of NOR 191, a NOR logic device 194, the output of which is applied along line 146 to the adder, a NOR logic device 200, the output of which is applied along line 142 to the input of the $V_r$ register and also to one input of NOR 192. The steering logic 152 includes a NOR logic device 196 having the output thereof connected to the input of register $AC_2$ and a NOR logic device 198 having the output thereof connected to the input of accumulator register $AC_1$. NOR 191 has the remaining input thereof connected to the output of a 5 input NOR 190, each input of which is connected to the output of an AND logic device.

A dual input AND 182, with the output connected to the input of NOR 190, has one input thereof connected to a timing signal from one of the eight pairs of timing outputs of the ROM, and the other input thereof connected to the output of register $AC_1$. A second dual input AND 184 has the output connected to the input of NOR 190 and one input thereof connected to line 103 of the ROM for receiving the constants $C_2$ with the other inputs thereof connected to one of the eight pairs of timing outputs of the ROM. A third dual input and AND 186 with output connected to the input of NOR 190 has one input thereof connected to line 107 of the ROM for receiving the governing equation constant $C_1$ and the second input thereof connected to one of the eight pairs of timing outputs of the ROM. A fourth dual input AND 188 with the output thereof connected to the input of NOR 190 has one input connected to the output of accumulator register $AC_1$ and the remaining input connected to one of the eight pairs of timing outputs of the ROM. A fifth dual input AND 189 with output connected to the input of NOR 190 has one input thereof connected to line 105 of the ROM receiving the value of the governing equation constant $C_0$, with the remaining input connected to one of the eight pairs of the timing outputs of the ROM.

Triple input NOR 192 has one input thereof connected to the output of the $V_g$ register 122, a second input connected to the output of a dual input NOR logic device 181 and, as mentioned above, the third input connected to the output of NOR 200. NOR 181 has both inputs thereof connected, respectively, to different ones of the pairs of timing outputs of the ROM and provides an ON-OFF timing function.

NOR 194 has the input thereof connected to the output of a five input NOR 193 which has the inputs thereof connected to the outputs of a plurality of AND logic devices 201, 202, 204 and 208. Dual input AND 201 has one input thereof connected to the binary one output of the ROM and the second input connected to one of the eight pairs of timing outputs of the ROM. AND 202 has one input connected to one of the eight pairs of timing outputs of the ROM and the remaining input connected to the output of accumulator register $AC_1$. AND 204 has one input thereof connected to one of the eight pairs of timing outputs of the ROM and the second input receiving the output of accumulator register $AC_2$. AND 206 and 208 connected with one input from $AC_2$ and the remaining input from the timing outputs of the ROM.

AND 200 receives an output from a dual input NOR 199, the output of which is also applied to the input of the $V_r$ register 142 which NOR 199 has one input connected to the output of a triple input AND logic device 236 and the remaining input connected to the output of a dual input AND 238. AND 236 has one input connected to one of the pairs of ROM timing outputs common with AND 184, NOR 181, AND 202 and AND 224, a second input connected to output 140 of the IW XFER latch from the ROM, and the third input connected to the output of the $V_g$ register 122. AND 238 has one input connected to one of the eight pairs of timing outputs from the ROM common with AND 210 and 204 NOR 181 and AND 186 with the remaining inputs thereof connected to the output of the $V_r$ register 142.

The steering logic section 152 comprises NOR 196 which has the input thereof connected to the output of a five input NOR 195 with the output of NOR 196 connected to the accumulator $AC_2$ and a NOR logic device 198 with the output thereof connected to the input of accumulator register $AC_1$ and the input of NOR 198 connected to the output of a four input NOR 197. NOR 195 has the inputs thereof connected, respectively, to the outputs of AND logic devices 210, 212, 214, 216 and 218. NOR 197 has each input connected to the output of a plurality of dual input AND logic devices 224, 226, 228 and 230. AND device 210, the output of which is connected to the input of NOR 195 has one input thereof connected to one of the eight pairs of timing outputs of the ROM and in common with one input of AND 204 and AND device 238. The remaining input of AND 210 is connected to the output line 150 of the adder and in common with one input of AND devices 212, 214, 224, 226, and 228. AND device 212 has the remaining input thereof connected to one of the separate pairs of timing outputs of the ROM. AND 214 has the remaining input thereof connected to one of the eight pairs of timing outputs of the ROM and in common with one input of AND 208 and 228. AND logic device 216 has one input thereof connected to a separate pair of timing outputs from the ROM and the remaining input connected to the output line 156 of accumulator register $AC_1$ and in common with one input of AND 182, AND 188, AND 202, and AND device 230. AND logic device 218 has one input connected to line 166 and the output of accumulator register $AC_2$ and in common with one input of AND devices 208, 206 and 204 with the remaining input of AND 218 connected to the output of a SET-RESET latch 242. Latch 242 has one input connected to the output of IW Latch 192 and the remaining input connected to a binary one output of the ROM.

AND logic device 224 has the output connected to the input of NOR 197 with one input of AND 224 connected to one of the eight pairs of ROM timing outputs and in common with one input of AND 184, NOR 181, AND 202, and AND 236. AND 226 has the remaining input thereof connected to one of the eight pairs of ROM timing outputs and in common with one input of AND 206, AND 201, and AND 182. AND logic device 228 has the remaining input connected to one of the eight pairs of ROM timing outputs and in common with one input of AND 214, AND 208 and AND 189. AND logic device 230 has one input thereof connected through the output line 156 of accumulator register $AC_1$ and in common with one input of AND 216, AND 202, AND 188 and AND 182. The remaining input of AND 230 is connected to the output of a separate SET-RESET latch 240, the inputs of which are connected to separate pairs of the timing output of the ROM.

For simplicity, the operation of the multiplex logic 54 and the steering logic 152 will be described with reference to computation of only one product term of the governing equation calculation and it will be understood by those having ordinary skill in the art that the logic operations will be similar for the computation of the remaining product term. The values of the governing equation constant $C_2$, $C_1$, $C_0$, having been predetermined, in a manner which will be hereinafter described, are clocked out of the ROM 82 at a rate of preferably 125 KHz and serially with all eight bits transmitted in a period of approximately 0.06 milliseconds. With te accumulator registers $AC_1$ and $AC_2$ initially empty, the first constant to be clocked out from the ROM is the constant $C_2$ which is transmitted for NOR 191 along line 144 to the adder. The least significant bit of $V_g$ is read from the $V_g$ register 122 through NOR 192, NOR 191 and along line 144 to the adder and is complemented by addition of binary one through NOR 194 along line 146 to the adder. The operation of the addition of the least significant bit LSB, of $\overline{C_2}$ plus the LSB of $\overline{V_g}$, as hereinabove previously explained, is logically equivalent to the partial product LSB $\overline{C_2}$. LSB $\overline{V_g}$. This partial product is then steered by appropriate timing signals through either NOR 196 and along line 162 to the accumulator $AC_2$ or through NOR 198 and along line 154 to the accumulator register $AC_1$. Next the second LSB of $C_2$ is read from the ROM, shifted through NOR 191 along line 144 to the adder and complemented and binary one is added from NOR 194 and the result sent along line 146 to the adder where the second LSB $\overline{C_2}$ is "multiplied" with the LSB of $\overline{V_g}$ as previously ejxplained. The partial product second LSB $\overline{C_2}$. LSB $\overline{V_g}$ is then shifted from the adder and steered through either NOR 196 or NOR 198 to either $AC_2$ or $AC_1$ and to the same register as the previous partial product LSB $\overline{C_2}$. LSB $\overline{V_g}$. This procedure is then repeated until all eight bits of the constant $C_2$ have been called from the ROM. It will be noted that NOR 192 supplies a binary one upon receipt of ROM. It will be noted that NOR 192 supplies a binary one upon receipt of ROM timing signals through AND 201 which is required to complete the process of subtraction by complement which is the logic process used to give the whole product $C_2 V_g$ a negative sign in the governing equation. The partial products are then all shifted to either $AC_1$ or $AC_2$. Latch 242 serves to perform the complementing function for the $C_2$ products being toggled by binary one input thereto and steers such complemented $C_2$ products through NOR 196 to accumulator $AC_2$.

Similarly, the product $C_1 R_r$ is obtained in accumulator $AC_1$ by calling sout $C_1$ bit-by-bit and performing multiplication to form partial products which are sent through NOR 194. However, it will be noted that no complementing is required since the $C_1 V_r$ term of the governing equation is always positive. The product $C_1 V_r$ is then steered through NOR 198 to accumulator $AC_1$. The resultant whole product $C_1 V_r$ is then added bit-by-bit to the whole product $C_2 V_g$ already loaded in the other of registers $AC_1$ or $AC_2$ and the sum $C_1 V_r + C_2 V_g$ is loaded in one of the registers $AC_1$ of $AC_2$. With reference to FIG. 9, the constant $C_0$ is also applied to the adder in the same manner as described above and may be likewise added bit-by-bit to the whole or total of the partial products, formed for $C_2 \cdot V_g$ and $C_1 V_r$. Thus one of the registers $AC_2$ or $AC_1$ is finally loaded with the sum $C_2 V_g + C_l + C_0$ which is then the value of the governing equation.

In the presently preferred practice, the values of the partial products processed through the adder 148 are in the form of an eight bit binary number. A simple negative logic gate may be used, such as a NOR device, to detect the absence of an overflow or ninth bit at the output of the register $AC_2$. This overflow bit detector will then serve as a negative number detection, since by the subtraction by complement technique employed in the presently disclosed arithmetic logic for the governing equation, where the value of the sum $C_0 - C_1 V_r + V_2 V_g$ is a negative number an overflow or "carry" bit will occur, which may then be detected by the NOR logic, which may be used to defeat the output of $AC_2$. The NOR logic thus serves to prevent a negative number value of the governing equation sum from being applied to counter 164, which cannot accept negative numbers, and subsequently the servoactuator 12.

Figures 10, 11:
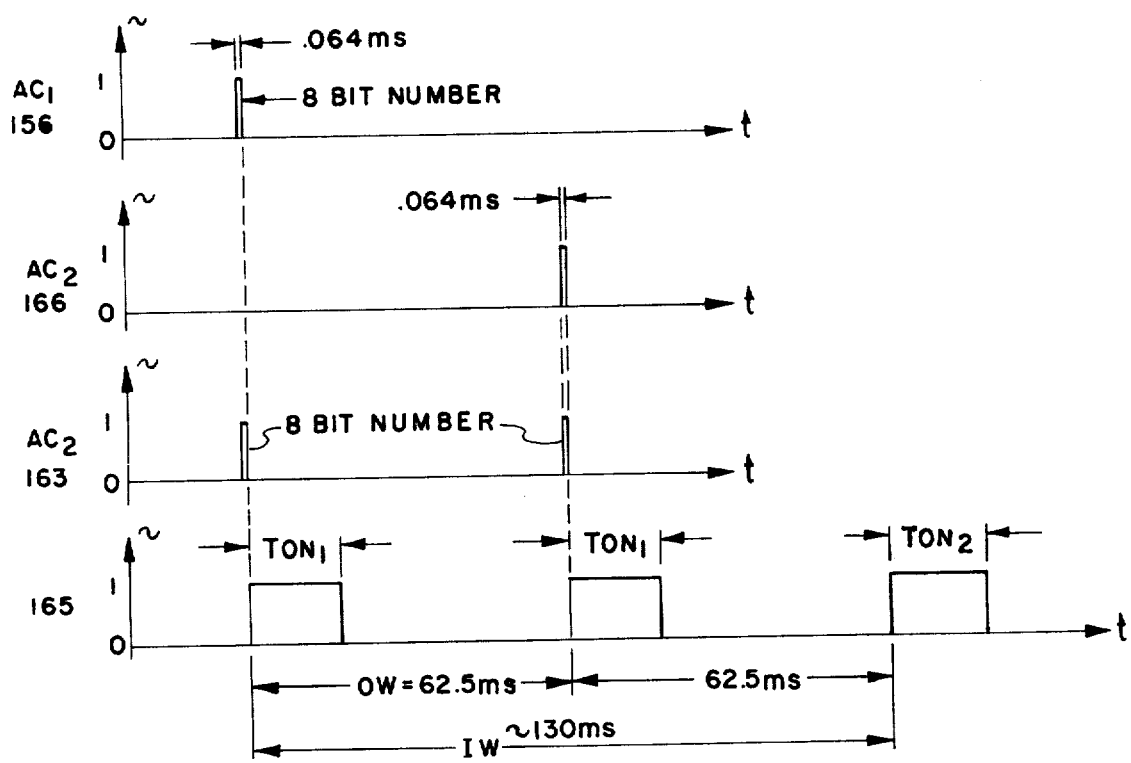
FIG. 10 is a truth table for the set-reset latch 94 of FIG. 3.
fig. 11 is a timing diagram for the count-down counter 194 of FIG. 6.

With reference to FIGS. 6 and 11, when the final value of the sum $C_2 V_g$ plus $C_0 V_r$ plus $C_0$ is loaded in either of the registers $AC_1$ or $AC_2$, and the sum is steered to register $AC_2$ and shifted to load the count down counter 164. The counter 164 is clocked to count down the value loaded therein from register $AC_2$ during the period of time equal to the output window OW which, in the presently preferred practice of the invention, is a period of 62.5 milliseconds. It will be noted that the OW has a duration of slightly less than one-half the period of the input window signal IW of 130 milliseconds, see FIGS. 4 and 5. Thus, the countdown counter 164 sends a pulse, represented as $T_{ON_1}$ in FIG. 11, from its output along line 165 which pulse has a width proportional to the value of the governing equation loaded in the counter 164. The pulse $T_{ON_1}$ occurs twice during each sampling period IW of the counter/shift register 122 (see FIG. 3). With reference again to FIG. 11, it will be noted that the register $AC_2$ has the sum value of the governing equation in the form of an eight-bit binary number clocked out very rapidly, preferably during a period of 0.064 milliseconds, and loaded in parallel format along lines 163 into the countdown counter 164. The transfer of the value of the sum for the governing equation parameters from register $AC_2$ into counter 164 occurs prior to the initiation of the countdown cycle of counter 164 as shown in FIG. 11.

The width-modulated pulses $T_{ON_1}$ from the countdown counter are sent along line 165 to one input of a dual input NOR 168 with the remaining input receiving a signal from the IDC generator 98, see FIG. 6. The output of NOR 168 is applied to one input of a dual input NOR 172, the output of which is amplified through gain element 178 and applied to the control signal input of the throttle servoactuator 12. NOR 172 also receives at its remaining input the brake inhibit signal from the output line 137 of latch 136, see FIG. 3. Referring again to FIG. 6, inhibit signal from line 137 is also applied to one input of a second dual input NOR 174, the output of which is applied through gain element 180 and through the brake switch 36, see also FIGS. 1 and 2, to the power terminal of the servoactuator 12.

Logically, the control signal pulses $T_{ON}$ as applied to NOR 168, see FIG. 6, produce a zero output therefrom along line 170 to one input of NOR 172. When zero output from the brake inhibit 137 is applied to the remaining input, NOR 172 is rendered conductive to the amplifier 178, thus passing the control pulse $T_{On}$ from counter 164 to the control terminal of the throttle servoactuator. Upon depression of the button 38, or rightward movement of switch 40, see FIG. 1, setting of the IDC latch 98 occurs and an IDC pulse of preferably 500 milliseconds duration is applied to one input of NOR 168 causing a zero output along line 170 which will render NOR 172 conductive so long as a zero pulse is applied from the inhibit line 137 to the remaining input thereof. Thus, the output gate network 56 of FIG. 6 is operative to pass either the IDC pulses, or the control pulses $T_{ON}$ from counter 164 so long as no signal is received from the brake inhibit line 137. Dual input NOR 174 has one input connected to the brake inhibit line 137 and the remaining input connected to the power-on-reset activated by the driver control switches 40 and is operative to disable the throttle servo upon receipt of a signal from either the brake inhibit line 137 or the power-on reset line. In operation, upon actuation of the vehicle service brakes by the driver and concurrent activation of brake switch 36, the control signal pulses $T_{ON}$ from counter 164 are thus cut off by NOR 172 from control input of the servoactuator 12; and, in addition, NOR 174 is operative to activate the power cut-off of the servoactuator through the brake switch 36. The power cut-off of the servoactuator is also activated by the driver's actuation of the ON/OFF slide switch 40 from the "OFF" to the "ON" position, which activates the power-on-reset applied to the input of NOR 174 thereby rendering same non-conductive and thus disabling, through amplifier 180, the servoactuator 12 through its power input. Also, if SET button 38 is held depressed, INHIBIT 176 will be operative and the servoactuator 12 will be disabled through both the control signal and power inputs, which produces the operational mode referred to as COAST, wherein the throttle cable 18 is released and the throttle T permitted to close.

In the presently preferred practice, the output pulses $T_{ON}$ on FIG. 11 are applied to the servoactuator at a frequency which is double that of the sampling frequency of the counter/ shift register 122 of FIG. 3. Thus, the control signal pulses to the servoactuator have a resolution of the order of twice the frequency of the data sampling period for the governing equation parameters.

With reference to FIGS. 4, 5 and 11, the preferred duty cycle period OW of 62.5 milliseconds, which yields a frequency of 16 Hz, is chosen so as to have the duty cycle preferably in the range 10-25 Hz which has been found to provide proper response of the known duty-cycle valve type pneumatic servoactuators. Maintaining the duty cycle in the preferred frequency range has been found to substantially reduce erratic motion or "dither" of the servoactuator. For vehicles having a time constant, that is time to respond linealy to 63% of a step-change in control speed on the order of ten seconds, it has been found satisfactory to use a servoactuator having a 63% time constant of the order of one-tenth to one-fifth that of the vehicle, or in the range 1-2 seconds and preferably 1.5 seconds. In general the electronic control system of the present invention has been found to function satisfactorily with a time constant on the order of one-tenth that of the servoactuator; and, in the present practice, for a particular servoactuator having a time constant of 1.5, it has been found preferable to have the control system time constant of 150 milliseconds or less. The time constant for the control system of the present invention is expressed as the sampling period of the counter 122 for counting the speed pulses from sensor 24, or the period of the IW signal, see FIGS. 4 and 5; and, for the particular embodiment of the invention descirbed herein, a period of about 130 milliseconds was found most satisfactory for the IW signal.

It will be appreciated that the value employed for a given control system time constant is interrelated with the characteristics of the particular signal source 24 which is used. For example, where one-half m.p.h. resolution of speed is desired, for a maximum control speed of 90 m.p.h. a pulse count of 180 pulses per IW, or speed sampling period, is required. In order to have a sampling period, or system time constant, of about 130 milliseconds, it will thus be necessary to have a speed signal source which produces 180 pulses in 128.6 milliseconds or one pulse per 0.074 seconds, which is the equivalent of a frequency of 1400 pulses per second, at 90 m.p.h.. Since the output of the signal source 24 is doubled by the frequency doubler 118 in the presently preferred practice, the source 20 will be required to emit 700 pulses per second at 90 m.p.h. or 7.77 pulses per second per m.p.h..

It will thus be apparent to those skilled in the art that the sampling period, or IW, once chosen with relation to the time constant of the servoactuator as described hereinabove, determines the required frequency characteristics of signal generator.

DETERMINATION OF GOVERNING EQUATION CONSTANTS

In order to predetermine the governing equation constants $C_0$, $C_1$ and $C_2$, it is necessary to determine the width of the control signal pulse $T_{ON}$ necessary to cause the particular servoactuator to initially overcome the preload forces of all springs and friction in the throttle linkage system. The chosen servoactuator is installed in a typical vehicle of substantially the same power-to-weight ratio for which the control system and the servoactuator is energized with a control signal of variable width until the actuator portion thereof produces a throttle linkage movement of approximately one-tenth of an inch. This small amount of throttle movement has been found to be particularly suitable for calibration purposes and generally corresponds to steady-state throttle at the lower control limit cut-off speed of about 30 miles per hour. It is then necessary to determine the control signal pulse width necessary to give approximately ¾ throttle stroke, which, for most vehicles, is substantially the maximum, or very nearly the maximum, throttle stroke and corresponds to steady-state throttle at the upper control limit speed of the operating range of the control system. Having determined the maximum and minimum control signal pulse width required for steady-state cruise of two extremes of the operating range of the speed control system, a mathematical procedure is then followed for determining the constants $C_0$, $C_1$ and $C_2$ for the governing equation. The governing equation is then expressed in the following form:

$$T_{ON} = C_0 + K_1 V_R + K_2 (V_R - V_G)$$

For the control situation of steady-state cruise, or zero speed error, that is where $V_R - V_G = 0$, the pulse width $T_{ON}$ is known for the two "boundary conditions": e.g. calibrated throttle stroke determined for the maximum and minimum control speeds. Thus the following expressions may be written:

$$T_{ON_1} = C_0 + K_1 V_{R_1}$$

$$T_{ON_2} = C_0 + K_1 V_{R_2}$$

The above two expressions may then be solved for $C_0$ and $K_1$ by utilizing the values of the pulse width $T_{ON}$ determined for the maximum and minimum throttle stroke conditions of, respectively, one-tenth and three-quarters of an inch by substituting these values respectively for $T_{ON_1}$ and $T_{ON_2}$ in the above expressions. $K_2$ is then empirically set at a value in the range 7.0 and 8.0, preferably 8.0, and the constant $C_1$ is then determined from the following expression:

$$C_1 = K_1 + K_2$$

The control system is then programmed with the above determined values of $C_0$, $C_1$, and $C_2$, where $C_2 = K_2$, and operated with the chosen servoactuator to determine whether adjustments or changes in the constant $K_2$ are necessary. Generally, it has been found satisfactory to set $K_2$ equal to the integer 8.0 and determine the constants $C_0$ and $C_1$; and, adjustments are then made to the control system by varying the sevoactuator gain. However, it will be understood that for the herein described control system, the constant K may be varied within the range 7.0 to 8.0 in order to establish proper control of the vehicle.

The foregoing description is exemplary of the presently preferred form of the invention in which a novel control signal is provided for controlling a servoactuator for a vehicle road speed regulator. The control system of the present invention utilizes electronic digital techniques for sensing vehicle speed and providing a control signal for operating the throttle servoactuator. The control system of the present invention employs a single countdown counter for sensing vehicle speed and providing a continuous indication thereof to the control logic; and, the single counter simultaneously provides for registration of a reference, or SET, speed signal upon command by the vehicle operator. Upon actuation by the driver of either the SET or RESUME conrol, the control system provides a control signal having an initial predetermined value, or initial duty cycle, sufficient to cause an initial movement of the throttle actuator of about 0.10 inch for overcoming friction and throttle spring preload. The control system of the present invention also provides the unique function of "TAP-UP" by incrementally increasing the vehicle speed by fixed increment upon command by the vehicle operator, and performs this operation by incrementing the sensed vehicle speed by a predetermind fixed increment at the instant of the operator command. The incremented vehicle speed is then registered and used by the control logic to provide a desired control signal which reflects the incrementally indexed vehicle speed. This latter function of the present invention is activated by a simple rapid depression of the driver's control button and provides a speed TAP-UP function which is accomplished entirely by feel and without requiring the driver to divert his attention from the road situations ahead of the vehicle.

It will be apparent to those having ordinary skill in the art that the invention described above in its presently preferred form is capable of modifications and variations and is, therefore, limited only by the following claims.

WHAT IS CLAIMED IS:

1. A control system for a vehicle road speed regulator of the type having an actuator connected to the vehicle throttle for controlling the vehicle about a speed selected by the vehicle operator, said control system comprising:
   a. means operable upon actuation by the vehicle operator to activate the regulator;
   b. means operable in response to said activating means to sense vehicle speed;
   c. means responsive to said speed sensing means and operable upon selective actuation by the vehicle operator to register said sensed speed to provide said selected speed;
   d. means operable to generate a control signal having certain characteristics thereof varied in response to deviation of the vehicle speed from said selected speed;
   e. said means operable to register said selected speed includes means operable upon selective actuation by the vehicle operator to increment said sensed speed a predetermined increment and means responsive to said incrementing means operable to register said incremental speed as said selected speed; and,
   f. means responsive to said control signal and adapted to move the vehicle throttle upon connection thereto for controlling the vehicle speed above said selected speed.

2. The device defined in claim 1, wherein said means operable to provide said control signal includes means operable to provide a predetermined initial value of said control signal in response to said selective actuation by said vehicle operator.

3. The device defined in claim 1, wherein said means operable to register said sensed speed includes switch means adapted for activation by the vehicle operator.

4. The device defined in claim 3, further comprising means responsive to said switch means and operable to provide a predetermined initial value of said control signal for accelerating the vehicle.

5. The device defined in claim 4 wherein said means operable to provide said initial value of said control signal includes means operative in response to repetitive actuation of said switch means to continuously accelerate the vehicle upon the time elapsed between said repetitive actuations being less than the time required to bring the vehicle to said incremented speed.

6. The device defined in claim 1, wherein said means operable to register said sensed speed includes a switch adapted for activation by the vehicle operator, said means operable to provide said control signal includes means operable to provide a predetermined initial value of said control signal in response to selective activation of said switch, and means operable in response to selective actuation of said switch to provide a control signal causing the vehicle to coast.

7. The device defined in claim 6, wherein said means operable to provide said predetermined initial control signal includes means responsive to selective repetitive actuation of said switch to produce a control signal causing continuous vehicle acceleration upon the time elapsed between said repetitive actuation being less than the time required to bring the vehicle to said incremented speed.

8. A method of regulating vehicle road speed about a speed selected by the vehicle operator comprising the steps of:
   a. sensing vehicle speed;
   b. registering said sensed speed at a time selected by the vehicle operator;
   c. providing a control signal having certain characteristics thereof proportional to the sum of
      i. a first predetermined constant,
      ii. a second predetermined constant multiplied by said registered speed, and
      iii. a third predetermined constant different from said second constant, multiplied by said sensed speed and applying said control signal to a throttle servoactuator;
   d. incrementing said sensed speed by a predetermined increment at a time selected by the vehicle operator and modifying said control signal accordingly;

e. moving the vehicle throttle in response to said control signal and accelerating the vehicle to said indexed speed and thereafter regulating speed about said incremented speed.

9. A method of regulating vehicle road speed about a speed selected by the vehicle operator comprising the steps of:
   a. sensing vehicle speed;
   b. registering said sensed speed at a time selected by the vehicle operator to provide said selected speed;
   c. providing a control signal having certain characteristics thereof varied in response to deviation of sensed speed from said selected speed;
   d. incrementing said sensed speed by a predetermined increment at a time selected by the vehicle operator;
   e. registering said incremented speed as said selected speed and modifying said control signal accordingly; and,
   f. moving the vehicle throttle in response to said control signal for regulating the vehicle at said selected speed.

10. A system for generating a control signal adapted for driving a vehicle throttle servoactuator, said system comprising:
   a. means operable upon actuation by the vehicle operator to activate and de-activate the system;
   b. means responsive to said activating means and operable to sense vehicle speed;
   c. means responsive to said speed sensing means and operable upon activation at a time selected by the vehicle operator to register sensed speed as said selected speed;
   d. means operable to provide a control signal having certain characteristics thereof varied in proportion to the sum of
      i. a first predetermined constant,
      ii. a second predetermined constant multiplied by said sensed speed,
      iii. a third predetermined constant different from said second constant and multiplied by said selected speed; and,
   e. said means operable to register selected speed includes means operable, upon selective actuation by the vehicle operator, to increment said sensed speed by a predetermined increment and to register said incremented speed as said selected speed.

11. The device defined in claim 10, wherein said speed sensing includes means operable to provide a digital indication of vehicle speed and said means operable to provide said control signal includes digital counting means operable to count said digital indication of vehicle speed and means operable to cycle said counting means for a predetermined cycle time, said means operable to provide a control signal further comprising digital means operable to serially compute said sum, and means operable to detect and block passage of a negative value of said sum.

12. A method of regulating vehicle speed about a speed selected by the vehicle operator comprising the steps of:
   a. sensing vehicle speed;
   b. generating a series of pulses indicative of said sensed speed;
   c. counting said pulses cyclically in a single counter for a predetermined cycle and registering the count accumulated during each cycle;
   d. shifting said count to a first storage register at the end of each of said counting cycles;
   e. shifting and holding said count in a second register at an instant selected by the vehicle operator;
   f. providing a control signal having certain characteristics thereof varied in response to deviation of said cyclic count from the count in said second register;
   g. moving the vehicle throttle in response to said control signal and regulating the vehicle speed about a speed corresponding to the count in said second register.

13. The device in claim 12, wherein said control signal has the characteristics thereof varied in response to the sum of
   i. a first predetermined constant,
   ii. a second predetermined constant multiplied by the count in said first register;
   iii. a third predetermined constant different from said second constant multiplied by the count in said second register.

14. A control system for a vehicle road speed regulator of the type having a servoactuator connected to the vehicle throttle and responsive to a control signal for controlling the vehicle about a speed selected by the vehicle operator, said control system comprising:
   a. means operable upon actuation by the vehicle operator to activate the control system;
   b. means operable in response to said activating means to sense vehicle speed;
   c. means responsive to said speed sensing means and operable to generate a series of pulses indicative of vehicle speed;
   d. a counter operable to count said pulses cyclically for a predetermined cycle and register the count accumulated during each cycle;
   e. first register means;
   f. means operable to shift said count to said first register means;
   g. second register means;
   h. means operable upon selective actuation by the vehicle operator to shift said count at the time of selection to said second register and operable to hold said selected count therein; and
   i. means operable to provide a control signal having certain characteristics thereof varied in accordance with the deviation of the count in said first register from the count in said second register.

15. A control system for a vehicle road speed regulator of the type having a servoactuator connected to the vehicle throttle and responsive to a control signal for controlling the vehicle about a speed selected by the vehicle operator, said control system comprising:
   a. means operable upon actuation and deactuation by the vehicle operator to activate and deactuate the control system;
   b. means operable in response to said activating means to sense vehicle speed;
   c. switch means associated with said speed sensing means and operable upon a first selected mode of actuation by the vehicle operator to register said sensed speed at the time of said selective actuation to provide said selected speed, said means being operable upon a second selected mode of actuation to increment said selected speed by a predetermined increment and register said incremented speed; and,
   d. means responsive to said first mode of actuation registering means and operable to provide said control signal for regulating vehicle speed about said sensed speed at the time of actuation, said means being operable in response to said second mode of actuation to provide a control signal for accelerating the vehicle to and thereafter regulating the vehicle about said incremented speed.

16. A control system for a vehicle road speed regulator of the type having a servoactuator connected to the vehicle throttle and responsive to a control signal for controlling the vehicle about a speed selected by the vehicle operator, said control system comprising:
  a. first switch means operable, upon actuation and deactuation by the vehicle operator, to activate and deactivate the control system;
  b. means operable in response to said actuating means to sense vehicle speed;
  c. second switch means having a first and second selected mode of actuation;
  d. logic means associated with said speed sensing means and operable in response to said first and second modes of actuation of said second switch means to register said sensed speed as said selected speed at the time of actuation of said second switch means, said logic means including means operable to
    i. provide an initial predetermined value of said control signal for causing an initial surge of vehicle acceleration and,
    ii. thereafter provide a running control signal for regulating the vehicle about said selected speed, wherein said logic means is operable in response to said first mode of actuation of said second switch means to provide a control signal for regulating the vehicle about said selected speed and operable in response to said second mode of operation of said second switch means to increment said sensed speed by a predetermined increment and register said incremented speed as said selected speed.

* * * * *